UNITED STATES PATENT OFFICE.

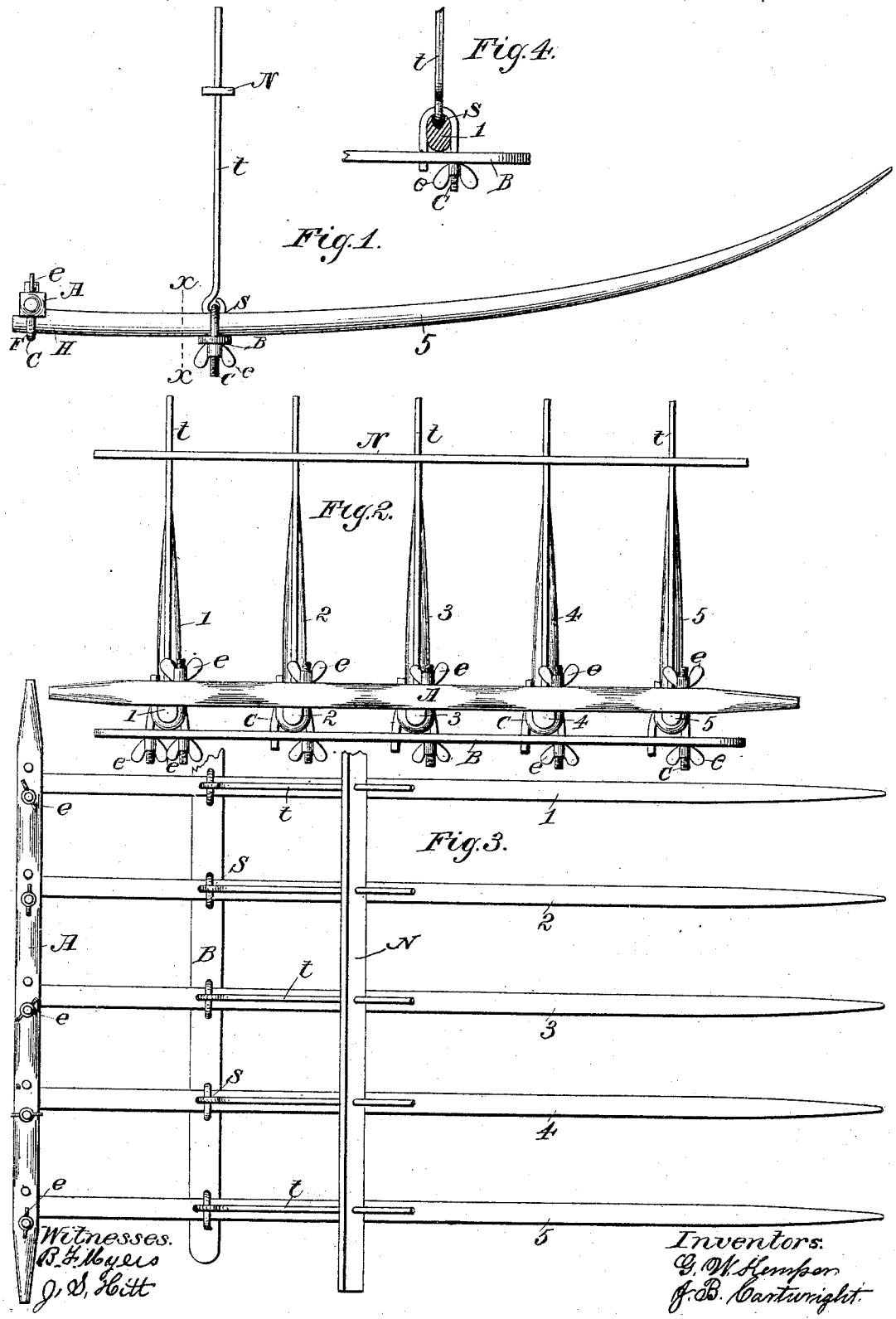

GEORGE W. KEMPER AND JOHN B. CARTWRIGHT, OF GOODLETTSVILLE, TENNESSEE.

GRAIN-CRADLE.

SPECIFICATION forming part of Letters Patent No. 271,335, dated January 30, 1883.

Application filed October 2, 1882. (Model.)

*To all whom it may concern:*

Be it known that we, GEORGE W. KEMPER and JOHN B. CARTWRIGHT, citizens of the United States, residing at Goodlettsville, in the county of Davidson and State of Tennessee, have invented certain new and useful Improvements in Grain-Cradles, of which the following is a specification.

Our invention relates to improvements in grain-cradles; and the object of our invention is to provide means by which any of the fingers can be taken out and new ones replaced, in a few minutes' time, without the use of any tools, thereby driving from the harvest-field the terror of broken cradle-fingers, which have hitherto been a great source of annoyance to harvesters. We attain these objects by the mechanism illustrated in the accompanying drawings, in which—

Figure 1 is a top view of the portion of the cradle to which our invention relates. Fig. 2 is a longitudinal view of Fig. 3, viewed from behind the head-post A. Fig. 3 is the front or inside view; and Fig. 4 is a piece cut out at $x\ x$, Fig. 1, to show the interior of the stirrups C and the mode of connecting the stay-rods $t$ to them.

Similar letters refer to similar parts throughout the several views.

The head-post A, the support-strip B, and the fingers 1 2 3 4 5 constitute the wood-work to which our invention relates. The stirrups C, with the thumb-nuts $e$, and the stay-rods $t$ constitute the metal portion of our invention. The head-post A is similar to the head-post of any other cradle, but is made square where the ends of the fingers connect with it, as shown in Fig. 1, and has two small holes through it at each of the fingers for the ends of the stirrups C to pass through, as shown in Fig. 3. By this mode of construction the head-post is greatly strengthened, there being no large holes cut through it for the reception of the ends of the fingers.

The support-strip B has holes through it in the same manner and for the same purpose as the head-post A, as shown in Fig. 2, the ends of the stirrups C passing through the holes in the support-strips B, with thumb-nuts $e\ e$, as shown at finger No. 1, Fig. 2; or one of the nuts may be left off, as shown at Nos. 2, 3, 4, 5.

The stay-rods $t$ are for the purpose of staying the fingers, as in other cradles, but are differently connected with the fingers, as shown at S, Figs. 1 and 4, the stirrups passing through the eye of the stay-rods $t$, and around the fingers and through the support-strip B, with thumb-nuts on the ends, which hold all secure. The fingers have slight shoulders where they rest against the head-post A, as shown at H, Fig. 1, which help to hold the fingers in their proper places. The fingers have little grooves in the outer edge at F, Fig. 1, in which the stirrups C rest, which prevent the fingers from coming out when the thumb-nuts are tight. The fingers have shallow sockets in the front edge at S, Figs. 1 and 4, which are for the purpose of receiving a part of the eye of the stay-rod $t$, which, while in the said socket, holds the stirrups C and the support-strip B in their proper places, and allows the stay-rods to be moved around to any desired angle. By this mode of construction the fingers are much stronger than if they had holes cut through them.

The fingers of this cradle may be oval, as shown at 1, Fig. 4; or a short space may be left square on the back where they rest against the support-strip B, so as to fill out the vacant space, as shown between the oval finger and the support-strip.

The fingers can be removed from their places very quick by loosening the thumb-nuts $e$, Fig. 1, until the stirrup C of head-post A is raised out of the groove in which it rests, and the one at support-strip B allows the eye of the stay-rod at S to rise out of the socket in the finger. The finger can then be drawn out of its place, and another replaced and made secure by tightening the thumb-nuts.

What we claim as our invention, and desire to secure by Letters Patent, is—

1. The combination, with the head-post A, support-strip B, and the cradle-fingers, of the stirrups C and thumb-nuts $e$, clamping the fingers to the head-post and support-strip, whereby individual removal of the fingers is permitted.

2. The combination, with the head-post A, support-strip B, the fingers, and the support-strip, of the tie-rods $t$, hooked in the stirrups, all substantially as set forth.

GEORGE W. KEMPER.
JOHN B. CARTWRIGHT.

Witnesses:
B. F. MYERS,
J. S. HITT.